United States Patent
Gao et al.

(10) Patent No.: US 11,614,964 B2
(45) Date of Patent: Mar. 28, 2023

(54) DEEP-LEARNING-BASED IMAGE PROCESSING METHOD AND SYSTEM

(71) Applicant: INSPUR ELECTRONIC INFORMATION INDUSTRY CO., LTD., Shandong (CN)

(72) Inventors: Kai Gao, Shandong (CN); Zhenhua Guo, Shandong (CN); Fang Cao, Shandong (CN)

(73) Assignee: INSPUR ELECTRONIC INFORMATION INDUSTRY CO., LTD., Shandong (CN)

( * ) Notice: Subject to any disclaimer, the term of this patent is extended or adjusted under 35 U.S.C. 154(b) by 0 days.

(21) Appl. No.: 17/642,371

(22) PCT Filed: Dec. 30, 2019

(86) PCT No.: PCT/CN2019/130002
§ 371 (c)(1),
(2) Date: Mar. 11, 2022

(87) PCT Pub. No.: WO2021/047118
PCT Pub. Date: Mar. 18, 2021

(65) Prior Publication Data
US 2022/0326989 A1    Oct. 13, 2022

(30) Foreign Application Priority Data

Sep. 12, 2019    (CN) .......................... 201910866485.5

(51) Int. Cl.
*G06F 9/46* (2006.01)
*G06F 9/48* (2006.01)
*G06F 12/0802* (2016.01)

(52) U.S. Cl.
CPC ........ *G06F 9/4881* (2013.01); *G06F 12/0802* (2013.01); *G06F 2212/60* (2013.01)

(58) Field of Classification Search
CPC . G06F 9/4881; G06F 12/0802; G06F 2212/60
See application file for complete search history.

(56) References Cited

U.S. PATENT DOCUMENTS

| 2003/0088739 A1 | 5/2003 | Wilkes et al. |
| 2003/0115243 A1 | 6/2003 | Smith |

(Continued)

FOREIGN PATENT DOCUMENTS

| CN | 102880449 A | 1/2013 |
| CN | 105869117 A | 8/2016 |

(Continued)

OTHER PUBLICATIONS

International Search Report and English Translation cited in PCT/CN2019/130002 dated Jun. 12, 2020, 6 pages.

(Continued)

*Primary Examiner* — Wissam Rashid
(74) *Attorney, Agent, or Firm* — Cooper Legal Group, LLC

(57) ABSTRACT

An image processing method is provided, which is applied to a deep learning model. A cache queue is provided in front of each layer of the deep learning model; a plurality of computation tasks are preset for each layer of the deep learning model in advance, and are configured for computing weight parameters and corresponding to-be-processed data in a plurality of channels in each corresponding layer in parallel, and storing a computation result into a cache queue behind the corresponding layer thereof; in addition, as long as the cache queue in front of the layer includes the computation result stored in the previous layer, the layer can obtain the to-be-processed data from the computation result, subsequent computation is performed, and a parallel pipeline computation mode is also formed between the layers. By means of the mode, the throughput rate during image processing is remarkably improved, and the image process- (Continued)

ing parallelism degree and speed and the computation performance of the deep learning model are improved. Further provided are an image processing device and system, which have the same beneficial effects as the above image processing method.

16 Claims, 2 Drawing Sheets

(56) References Cited

U.S. PATENT DOCUMENTS

| | | |
|---|---|---|
| 2013/0167152 A1 | 6/2013 | Jeong |
| 2018/0307494 A1 | 10/2018 | Ould-Ahmed-Vall et al. |
| 2019/0146800 A1 | 5/2019 | Ould-Ahmed-Vall et al. |

FOREIGN PATENT DOCUMENTS

| | | |
|---|---|---|
| CN | 105893158 A | 8/2016 |
| CN | 107609641 A | 1/2018 |
| CN | 108595379 A | 9/2018 |
| CN | 109102463 A | 12/2018 |
| CN | 109117285 A | 1/2019 |
| CN | 109712064 A | 5/2019 |
| CN | 109934339 A | 6/2019 |
| CN | 110188596 A | 8/2019 |

OTHER PUBLICATIONS

Written Opinion and English Translation cited in PCT/CN2019/130002 dated Jun. 12, 2020, 4 pages.

Notification to Grant Patent Right for Invention together with the Search Report of corresponding CN priority application CN201910866485.5, dated Jul. 5, 2022, 8 pages.

Feng Van et al, Efficient Deep Neural Network Serving: Fast and Furious, (IEEE Transactions on Network and Service Management), vol. 15, No. 1 entire document, Mar. 31, 2018, 15 pages.

Jingli Zhou et al, Distributed Cache Queries Model Based on J2EE Application Clustered Caching, (Computer Engineering), vol. 31 No. 4, entire text with English translation, Feb. 29, 2005, 13 pages.

DEEP-LEARNING-BASED IMAGE PROCESSING METHOD AND SYSTEM

CROSS-REFERENCE TO RELATED APPLICATIONS

The present application claims priority to Chinese Patent Application No. 201910866485.5, filed to the China Patent Office on Sep. 12, 2019, entitled "Image processing method, device and system", the contents of which are hereby incorporated by reference in its entirety.

TECHNICAL FIELD

The present invention relates to the technical field of image processing, in particular to an image processing method, device and system.

BACKGROUND ART

Deep learning has brought great development progress to the field of artificial intelligence, but the training phase and inference phase of deep learning models require a large number of computations, mainly because the existing image processing methods only support deep learning models to perform one computation at the same time, thus making the computation sequence of deep learning models as follows: the first channel of the first layer, the second channel of the first layer up to the last channel of the first layer, the first channel of the second layer, the second channel of the second layer up to the last channel of the second layer... the first channel of the last layer, the second channel of the first layer up to the last channel of the first layer. This also makes it possible for a single training phase based on a benchmark dataset such as ImageNet to take up to a week to complete on a single machine with a modern GPU (Graphics Processing Unit). In the inference phase, a single model inference may also take more than ten or even tens of seconds to complete for a single image. Thus, in the field of video object detection, a video can be regarded as a plurality of images, and because of the slow speed of model inference for each image, the real-time requirement is not met at all. It can be seen that how to improve the processing speed of images becomes a problem that needs to be solved by those skilled in the art at present.

SUMMARY OF THE INVENTION

The present invention aims to provide an image processing method, device and system, which significantly improves the throughput rate during image processing, and increases the processing speed of images and the computation performance of deep learning models.

To solve the above technical problems, the present invention provides an image processing method which is applied to a deep learning model, in which a cache queue is provided in front of each layer of the deep learning model. The image processing method includes that:

a global scheduler divides a received to-be-processed image into a plurality of channel data and stores the plurality of channel data into the cache queue in front of the first layer of the deep learning model;

a local scheduler of each layer obtains the to-be-processed data corresponding to the plurality of channels from the cache queue in front of the corresponding layer thereof, and calls a plurality of computation tasks corresponding to the corresponding layer thereof to compute the weight parameters and the corresponding to-be-processed data in the plurality of channels, and stores the computation result into the cache queue behind the corresponding layer thereof.

Preferably, the number of the computation tasks is equal to the number of channels of the corresponding layer.

Preferably, the number N of the computation tasks is smaller than the number M of channels of the corresponding layer.

Preferably, the local scheduler obtains the to-be-processed data corresponding to the plurality of channels from the cache queue in front of the corresponding layer thereof, and calls a plurality of computation tasks corresponding to the corresponding layer thereof to compute the weight parameters and the corresponding to-be-processed data in the plurality of channels, which includes that:

the local scheduler first obtains the to-be-processed data corresponding to the N channels from the cache queue in front of the corresponding layer thereof, and calls the N computation tasks corresponding to the corresponding layer thereof to compute the weight parameters and the corresponding to-be-processed data in the N channels in one-to-one correspondence.

When a computation task that has completed the computation appears, the to-be-processed data corresponding to the uncomputed channels is obtained from the cache queue in front of the corresponding layer thereof, and the computation task that has completed the computation is called to continue to compute the weight parameters and the corresponding to-be-processed data in the uncomputed channels until all the channels in the corresponding layer thereof have been computed.

Preferably, the computation task is a multiplication computation.

Preferably, after the local scheduler obtains the to-be-processed data corresponding to a plurality of channels from the cache queue in front of the corresponding layer thereof, the method further includes that:

the local scheduler sends the read information of the to-be-processed data to the corresponding local scheduler of the previous layer of the local scheduler through the global scheduler, so that the local scheduler corresponding to the previous layer of the local scheduler starts to process the next to-be-processed image, and the computation result is saved to the storage position of the to-be-processed data corresponding to the read information of the to-be-processed data.

To solve the above technical problems, the present invention further provides an image processing device which is applied to a deep learning model, in which a cache queue is provided in front of each layer of the deep learning model. The image processing device includes:

a global scheduler for dividing a received to-be-processed image into a plurality of channel data and storing the plurality of channel data into the cache queue in front of the first layer of the deep learning model;

a local scheduler of each layer for obtaining the to-be-processed data corresponding to the plurality of channels from the cache queue in front of the corresponding layer thereof, and calling a plurality of computation tasks corresponding to the corresponding layer thereof to compute the weight parameters and the corresponding to-be-processed data in the plurality of channels, and storing the computation result into the cache queue behind the corresponding layer thereof.

Preferably, the number N of the computation tasks is smaller than the number M of channels of the corresponding layer.

Preferably, the local scheduler obtains the to-be-processed data corresponding to the plurality of channels from the cache queue in front of the corresponding layer thereof, and calls a plurality of computation tasks corresponding to the corresponding layer thereof to compute the weight parameters and the corresponding to-be-processed data in the plurality of channels, which includes:

the local scheduler first obtains the to-be-processed data corresponding to the N channels from the cache queue in front of the corresponding layer thereof, and calls the N computation tasks corresponding to the corresponding layer thereof to compute the weight parameters and the corresponding to-be-processed data in the N channels in one-to-one correspondence.

When a computation task that has completed the computation appears, the to-be-processed data corresponding to the uncomputed channels is obtained from the cache queue in front of the corresponding layer thereof, and the computation task that has completed the computation is called to continue to compute the weight parameters and the corresponding to-be-processed data in the uncomputed channels until all the channels in the corresponding layer thereof have been computed.

To solve the above technical problems, the present invention further provides an image processing system which is applied to a deep learning model, in which a cache queue is provided in front of each layer of the deep learning model. The image processing system includes:

a memory for storing computer program;

a processor for performing the steps of the image processing method as described above when executing the computer program.

The present invention provides an image processing method applied to a deep learning model in which a cache queue is provided in front of each layer of the deep learning model. In the present application, a plurality of computation tasks are preset for each layer of the deep learning model in advance, and are configured for computing weight parameters and corresponding to-be-processed data in a plurality of channels in each corresponding layer in parallel, and storing a computation result into a cache queue behind the corresponding layer thereof; in addition, as long as the cache queue in front of the layer includes the computation result stored in the previous layer, the layer can obtain the to-be-processed data from the computation result, subsequent computation is performed, and a parallel pipeline computation mode is also formed between the layers. By means of the mode, the throughput rate during image processing is remarkably improved, and the image processing parallelism degree and speed and the computation performance of the deep learning model are improved.

The present invention further provides an image processing device and an image processing system with the same beneficial effects as the above image processing method.

BRIEF DESCRIPTION OF THE DRAWINGS

To more clearly illustrate the technical solutions in the embodiments of the present invention, the drawings required in the prior art and the embodiments will be briefly described below. It is clear that the drawings in the following description are merely some embodiments of the present invention. For a person of ordinary skill in the art, other drawings may be obtained according to these drawings without creative efforts.

DETAILED DESCRIPTION OF THE INVENTION

The core of the present invention is to provide an image processing method, device and system that significantly improves the throughput rate during image processing and increases the processing speed of images and the computation performance of deep learning models.

To make the objectives, technical solutions and advantages of the embodiments of the present invention clearer, the technical solutions in the embodiments of the present invention will be clearly and completely described below with reference to the accompanying drawings in the embodiments of the present invention. It is clear that the embodiments described are part of the embodiments of the present invention, rather than all of the embodiments. All other embodiments obtained by a person of ordinary skill in the art based on the embodiments of the present invention without creative efforts shall fall within the protection scope of the present invention.

Figure 1:
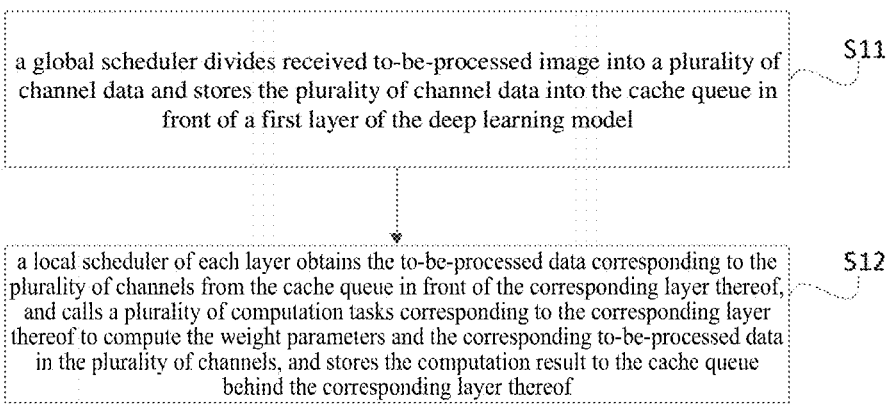
FIG. 1 is a flowchart of an image processing method according to the present invention.
Figure 2:
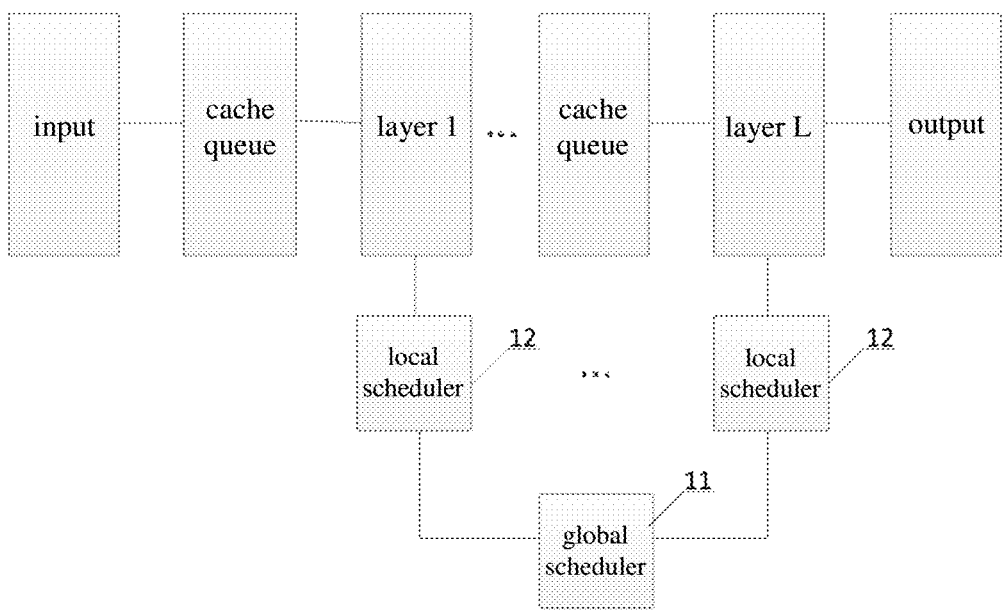
FIG. 2 is a schematic structural diagram of an image processing device according to the present invention.

Referring to FIG. 1 and FIG. 2, FIG. 1 is a flowchart of an image processing method according to the present invention, and FIG. 2 is a schematic structural diagram of an image processing device according to the present invention.

The image processing method is applied to a deep learning model with a cache queue provided in front of each layer of the deep learning model. The image processing method includes:

S11: a global scheduler divides received to-be-processed image into a plurality of channel data and stores the plurality of channel data into the cache queue in front of a first layer of the deep learning model;

S12, a local scheduler of each layer obtains the to-be-processed data corresponding to the plurality of channels from the cache queue in front of the corresponding layer thereof, and calls a plurality of computation tasks corresponding to the corresponding layer thereof to compute the weight parameters and the corresponding to-be-processed data in the plurality of channels, and stores the computation result to the cache queue behind the corresponding layer thereof.

Specifically, the present application first provides a cache queue in front of each layer of the deep learning model, for example, as shown in FIG. 2, a cache queue is arranged in front of the layer 1, and a cache queue is arranged in front of the layer 2 . . . until a cache queue is arranged in front of the layer L, and L is an integer not less than 2. The cache queue is configured for storing the to-be-processed data of a subsequent layer. For the cache queue corresponding to the layer 1, it stores the plurality of channel data after dividing the to-be-processed image. For the cache queue corresponding to the layer 2, it stores the computation result of the layer 1. And so on, for the cache queue corresponding to the layer L, it stores the computation result of the layer L−1.

The present application further provides a plurality of computation tasks (specifically, multiplication operations) for each layer in the deep learning model, and the computation tasks herein may be understood as threads. At the same moment, one computation task computes one channel The number of computation tasks for each layer is related to the number of channels of the layer, and in general, the more the number of channels of the layer, the more computation tasks are set. If the performance of the computer is relatively high, the number of computation tasks can be the same as the number of channels of the layer, so that the parallel processing effect of each channel can be maximized, that is, all channels of the layer are computed in parallel at the same time; if the performance of the computer is not so high, the number of computation tasks can be less than the number of channels of the layer, and in this way, part of the channels in the layer will be computed in parallel.

Figure 3:
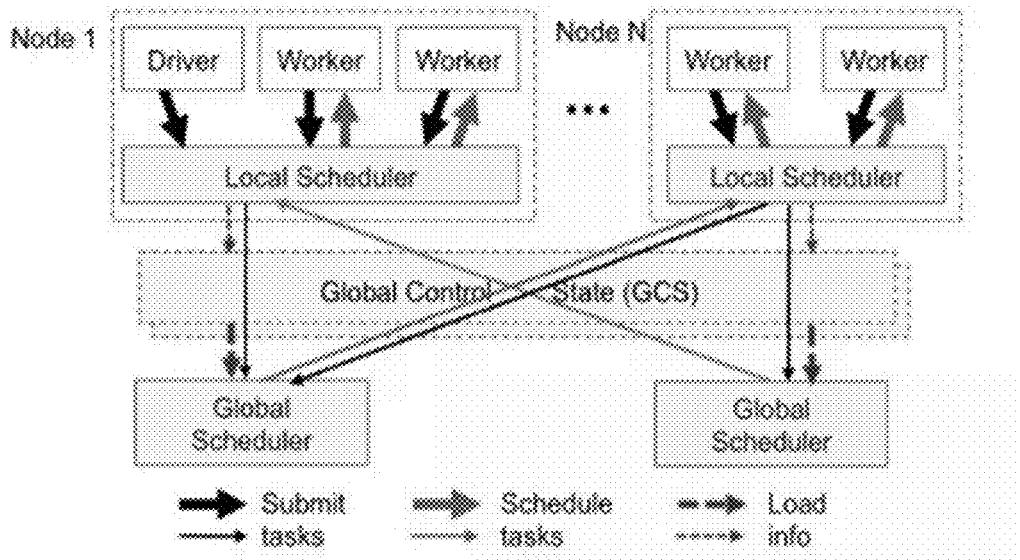
FIG. 3 is a schematic diagram of a Ray distributed framework according to the present invention.

It should also be noted that the present application uses a combination of the deep learning model and the Ray distributed framework to divide and each layer in the deep learning model and each channel in each layer. Referring to FIG. 3, which shows a schematic diagram of a Ray distributed framework according to the present invention. The principle of the Ray distributed framework is as follows: each server is regarded as a Node, each Node can open a plurality of workers, each worker is a computing unit to perform the computation of the task. The global scheduler can distribute a plurality of tasks to the local scheduler, and the local scheduler distributes the tasks to different workers according to different strategies. The global scheduler can further query the completion status of relevant tasks in real time. For each task, it can be very simple to perform the computation. The three functions ray.put( ), ray.remote( ), ray.get( ) can be used to perform the input, computation, and return value obtaining of a task, and each task is independent of each other. If the computation of one task requires the output of another task, the corresponding value can be obtained through ray.get( ).

In the present application, each layer of the deep learning model corresponds to a local scheduler in one-to-one correspondence, and the whole corresponds to a global scheduler. The local scheduler performs scheduling processing on the channels of each layer, and the global scheduler performs scheduling processing on all layers. The computation between channels is independent.

Figure 4:
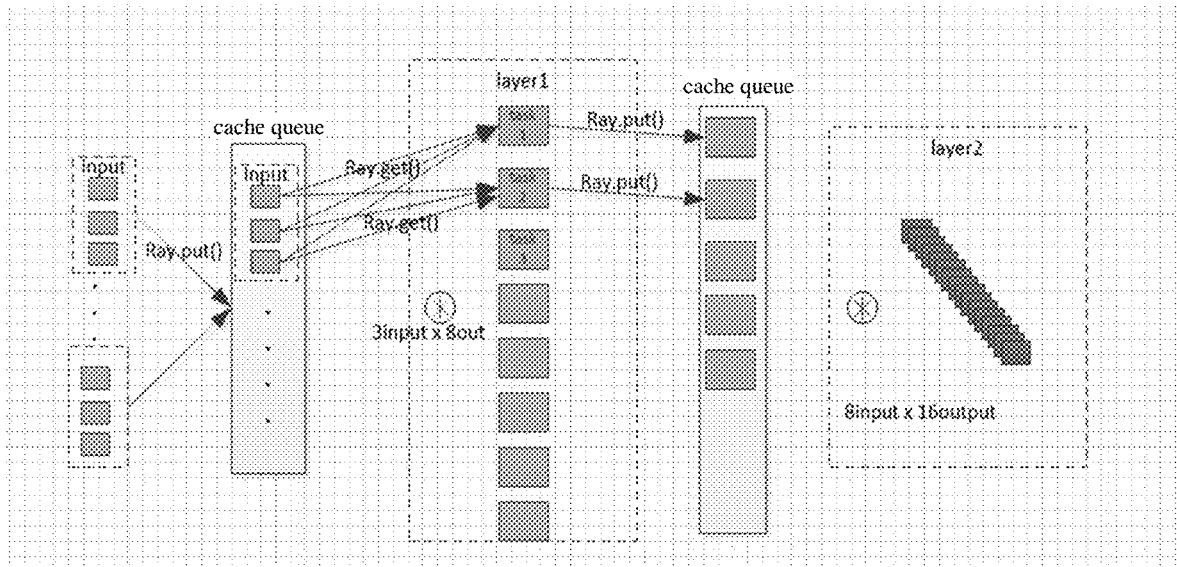
FIG. 4 is a schematic diagram of Ray scheduling based on a deep learning model according to the present invention.

Specifically, referring to FIG. 4, which shows a schematic diagram of a Ray scheduling based on a deep learning model according to the present invention. After receiving the to-be-processed image, the global scheduler divides the to-be-processed image into a plurality of channel data, for example, dividing into three color channels R, G, B, and storing the plurality of channel data into a cache queue in front of the first layer (i.e., layer 1) of the deep learning model. During the operation process, since there are a plurality of preset computation tasks corresponding to each layer, the plurality of channels in each layer can be computed at the same time. Specifically, the local scheduler of each layer obtains the to-be-processed data corresponding to the plurality of channels from the cache queue in front of the layer according to the number of computation tasks of the layer and calls a plurality of computation tasks corresponding to the corresponding layer thereof to compute weight parameters and the corresponding to-be-processed data in the plurality of channels. If the number of the computation tasks is the same as the number of the channels, then a plurality of computation tasks can be called once to complete the computation for the layer; if the number of the computation tasks is smaller than the number of the channels, a plurality of computation tasks can be called to compute a plurality of channels first, and the remaining channels are computed by calling the computed computation tasks after the computation of the existing channels is completed. In addition, in this way, a computation result is written into the cache queue whenever a computation task is completed. A certain computation task in the next layer can start computing as soon as its required value is obtained through ray.get( ). Therefore, when there are many input images, the computation between layers can achieve the pipeline effect, and the computation of each channel in the layer can achieve the effect of parallel computation.

In summary, the present invention provides an image processing method applied to a deep learning model in which a cache queue is provided in front of each layer of the deep learning model. In the present application, a plurality of computation tasks are preset for each layer of the deep learning model in advance, and are configured for computing weight parameters and corresponding to-be-processed data in a plurality of channels in each corresponding layer in parallel, and storing a computation result into a cache queue behind the corresponding layer thereof; in addition, as long as the cache queue in front of the layer includes the computation result stored in the previous layer, the layer can obtain the to-be-processed data from the computation result, subsequent computation is performed, and a parallel pipeline computation mode is also formed between the layers. By means of the mode, the throughput rate during image processing is remarkably improved, and the image processing parallelism degree and speed and the computation performance of the deep learning model are improved.

On the basis of the above embodiments:

as a preferred embodiment, the number of the computation tasks is equal to the number of channels of the corresponding layer.

As mentioned in the above embodiment, when the performance of the computer allows, the number of the computation tasks in each layer can be set to be the same as the number of the channels, and when the plurality of computation tasks are subsequently called to compute these channels, then a plurality of computation tasks are called once to complete the computation of the layer. All channels in the layer achieve complete parallel computation, which further improves the processing speed of computation and the computation performance of the deep learning model.

As a preferred embodiment, the number N of the computation tasks is smaller than the number M of channels of the corresponding layer.

When the performance of the computer is low, the number N of the computation tasks corresponding to each layer is smaller than the number M of channels of the corresponding layer, so that all the channels in a layer may not be completely parallel, but are partially parallel and partially serial, that is, a combination of serial and parallel. For example, the N channels computed first are parallel, and the following M–N channels can be parallel (after all the N channels to be computed first are all computed, then the N computation tasks of which the previous batch of channels have been computed are called to continue the computation of the latter batch of uncomputed channels), or serial (as long as the computation of the previously computed channel is completed, the completed computation task can be called to continue to compute the channel). However, compared with the all-serial in the prior art, the processing speed of the computation and the computation performance of the deep learning model is also improved.

As a preferred embodiment, the local scheduler obtains the to-be-processed data corresponding to the plurality of channels from the cache queue in front of the corresponding layer thereof, and calls a plurality of computation tasks corresponding to the corresponding layer thereof to compute the weight parameters and the corresponding to-be-processed data in the plurality of channels, which includes:

the local scheduler first obtains the to-be-processed data corresponding to the N channels from the cache queue in front of the corresponding layer thereof, and calls the N computation tasks corresponding to the corresponding layer thereof to compute the weight parameters and the corresponding to-be-processed data in the N channels in one-to-one correspondence.

When a computation task that has completed the computation appears, the to-be-processed data corresponding to the uncomputed channels is obtained from the cache queue in front of the corresponding layer thereof, and the computation task that has completed the computation is called to continue to compute the weight parameters and the corresponding to-be-processed data in the uncomputed channels until all the channels in the corresponding layer thereof have been computed.

To improve the processing speed of the computation and the computation performance of the deep learning model as much as possible, in this embodiment, when the number N of computation tasks is smaller than the number M of channels of the corresponding layer, the local scheduler obtains the to-be-processed data corresponding to the N channels from the cache queue in front of the corresponding layer thereof, and calls the N computation tasks corresponding to the corresponding layer thereof to compute the weight parameters and the corresponding to-be-processed data in the N channels in one-to-one correspondence. In the subsequent process, it does not wait until all the N channels in the batch are computed before calling the N computation tasks to compute the next batch, but once there is a computation task that completes the computation, it calls the computation task that completes the computation of the previous channel to continue the computation of the next uncomputed channel, until all the channels in the corresponding layer thereof have been computed.

Specifically, assuming that a certain layer has four channels A, B, C, D and F, and the layer corresponds to three computation tasks, then the local scheduler can first call three computation tasks to compute A, B and C in one-to-one correspondence, wherein it takes 3 s to compute A, 2 s to compute B, 1 s is to compute C, 1.5 s to compute D 1 s and is to compute F. Since A, B and C are processed in parallel, then C will finish computation first, followed by B, and A will finish computation last. After the channel C is computed, the local scheduler will continue to call the computation task that has finished computing channel C to continue computing channel D. In addition, after the channel B is computed, the local scheduler will continue to call the computation task that has finished computing channel B to continue computing channel F. It can be seen that it only takes 3s to finish the computation for the layer, compared with the traditional technology that requires 3+2+1+1.5+1=7.5 s, as well as compared with 3+1.5=4.5 s required for parallel computation of D and F after all of A, B and C have been computed, this embodiment can improve the processing speed of computation and the computation performance of the deep learning model.

As a preferred embodiment, the computation task is a multiplication computation.

Specifically, in this embodiment, calling the computation task to compute the weight parameter and the corresponding to-be-processed data in the channel is specifically the multiplication operation of the weight parameter and the to-be-processed data.

As a preferred embodiment, after the local scheduler obtains the to-be-processed data corresponding to a plurality of channels from the cache queue in front of the corresponding layer thereof, the embodiment further includes:

the local scheduler sends the read information of the to-be-processed data to the corresponding local scheduler of the previous layer of the local scheduler through the global scheduler, so that the local scheduler corresponding to the previous layer of the local scheduler starts to process the next to-be-processed image, and the computation result is saved to the storage position of the to-be-processed data corresponding to the read information of the to-be-processed data.

In this embodiment, considering that the storage space of some cache queues is limited, as the computation result of each image will exist in the cache queue, when there are more images, the to-be-processed data in the cache queue which has been read by the next layer needs to be deleted and stored again or directly overwritten and stored.

Therefore, in this embodiment, during the process of flow processing between layers, when the local scheduler of a layer has read the to-be-processed data of the previous layer, it generates the read information of the to-be-processed data, and sends the read information of the to-be-processed data to the global scheduler. After receiving the read information of the to-be-processed data, the global scheduler sends the read information of the to-be-processed data to a local scheduler corresponding to the previous layer of the local scheduler. The local scheduler corresponding to the previous layer of the local scheduler receives the read information of the to-be-processed data and then starts the processing of the next to-be-processed image. After the computation result is obtained, it can either overwrite and store or delete the to-be-processed data corresponding to the read information of the to-be-processed data first and then store it. It should also be noted that, in general practice, the cache queue can store the computation results of thousands or hundreds of images at the same time, which can ensure the pipeline operation between layers, but when there are too many images (for example, tens of thousands of images), the read to-be-processed data needs to be replaced.

Referring to FIG. 2, the image processing device is applied to a deep learning model, in which a cache queue is provided in front of each layer of the deep learning model. The image processing device includes:

a global scheduler 11, configured for dividing a received to-be-processed image into a plurality of channel data and storing the plurality of channel data into the cache queue in front of the first layer of the deep learning model;

a local scheduler 12 of each layer, configured for obtaining the to-be-processed data corresponding to the plurality of channels from the cache queue in front of the corresponding layer thereof, and calls a plurality of computation tasks corresponding to the corresponding layer thereof to compute the weight parameters and the corresponding to-be-processed data in the plurality of channels, and stores the computation result to the cache queue behind the corresponding layer thereof.

As a preferred embodiment, the number N of the computation tasks is smaller than the number M of channels of the corresponding layer.

As a preferred embodiment, the local scheduler 12 obtains the to-be-processed data corresponding to the plurality of channels from the cache queue in front of the corresponding layer thereof, and calls a plurality of computation tasks corresponding to the corresponding layer thereof to compute the weight parameters and the corresponding to-be-processed data in the plurality of channels, which includes:

the local scheduler 12 first obtains the to-be-processed data corresponding to the N channels from the cache queue in front of the corresponding layer thereof, and calls the N computation tasks corresponding to the corresponding layer thereof to compute the weight parameters and the corresponding to-be-processed data in the N channels in one-to-one correspondence.

When a computation task that has completed the computation appears, the to-be-processed data corresponding to the uncomputed channels is obtained from the cache queue in front of the corresponding layer thereof, and the computation task that has completed the computation is called to continue to compute the weight parameters and the corresponding to-be-processed data in the uncomputed channels until all the channels in the corresponding layer thereof have been computed.

For the introduction of the image processing device according to the present invention, reference is made to the above method embodiment, and details are not described herein again.

Figure 5:
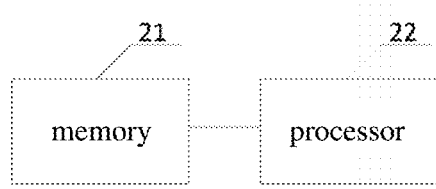
FIG. 5 is a schematic structural diagram of an image processing system according to the present invention.

Referring to FIG. 5, which is a schematic structural diagram of an image processing system according to the present invention. The image processing system is applied to a deep learning model, a cache queue being provided in front of each layer of the deep learning model, the system includes:

a memory 21 configured to store computer program;

a processor 22 configured to perform the steps of the above-mentioned image processing method when executing the computer program.

For the introduction of the image processing system according to the present invention, reference is made to the above method embodiment, and details are not described herein again.

It should be noted that in this specification, the terms "include", " comprise" or any other variation thereof are intended to cover non-exclusive inclusion, such that a process, method, article, or apparatus that includes a series of elements includes not only those elements, but also includes other elements not explicitly listed, or an element inherent to such a process, method, article, or apparatus. Without further limitations, the elements defined by the phrase "including a . . . " do not exclude the existence of additional identical elements in the process, method, article, or apparatus that includes the elements.

The above description of the disclosed embodiments enables those skilled in the art to implement or use the present invention. Various modifications to these embodiments will be readily apparent to those skilled in the art. The general principles defined herein may be implemented in other embodiments without departing from the spirit or scope of the present invention. Therefore, the present invention will not be limited to these embodiments shown herein, but should conform to the broadest scope consistent with the principles and novel features disclosed herein.

What is claimed is:

1. An image processing method, applied to a deep learning model, wherein a cache queue is provided in front of each layer of the deep learning model, wherein the image processing method comprises:

dividing a received to-be-processed image into a plurality of channel data and storing the plurality of channel data into the cache queue in front of a first layer of the deep learning model; and obtaining a to-be-processed data corresponding to a plurality of channels from the cache queue in front of at least one layer of the deep learning model, and calling a plurality of computation tasks corresponding to the at least one layer to compute weight parameters and corresponding to-be-processed data in the plurality of channels, and storing computation result into the cache queue behind the at least one layer.

2. The image processing method according to claim 1, wherein, a number of the computation tasks is equal to a number of channels of the at least one layer.

3. The image processing method according to claim 1, wherein, a number N of the computation tasks is smaller than a number M of channels of the at least one layer.

4. The image processing method according to claim 3, wherein, obtaining the to-be-processed data corresponding to the plurality of channels from the cache queue in front of the at least one layer, and calling the plurality of computation tasks corresponding to the at least one layer to compute the weight parameters and the corresponding to-be-processed data in the plurality of channels, comprises:

obtaining the to-be-processed data corresponding to N channels from the cache queue in front of the at least one layer, and calling N computation tasks corresponding to the at least one layer to compute the weight parameters and the corresponding to-be-processed data in the N channels in one-to-one correspondence; and when a computation task that has completed the computation appears, the to-be-processed data corresponding to uncomputed channels is obtained from the cache queue in front of the at least one layer, and the computation task that has completed the computation is called to continue to compute the weight parameters and the corresponding to-be-processed data in the uncomputed channels until all the channels in the at least one layer have been computed.

5. The image processing method according to claim 1, wherein, at least one of the computation tasks is a multiplication computation.

6. The image processing method according to claim 1, wherein, after obtaining the to-be-processed data corresponding to the plurality of channels from the cache queue in front of the at least one layer, the method further comprises:

sending read information of the to-be-processed data corresponding to a previous layer, so that a next to-be-processed image corresponding to the previous layer is processed, and the computation result is saved to a storage position of the to-be-processed data corresponding to the read information of the to-be-processed data.

7. An image processing system, applied to a deep learning model, wherein, a cache queue is provided in front of each layer of the deep learning model, and the image processing system comprises:

a memory for storing computer program; and a processor for performing steps of the image processing method according to claim 1 when executing the computer program.

8. An image processing system, applied to a deep learning model, wherein a cache queue is provided in front of each layer of the deep learning model, and the image processing system comprises:

a memory for storing computer program; and a processor for performing steps of the image processing method according to claim 2 when executing the computer program.

9. An image processing system, applied to a deep learning model, wherein a cache queue is provided in front of each layer of the deep learning model, and the image processing system comprises:

a memory for storing computer program; and a processor for performing steps of the image processing method according to claim 3 when executing the computer program.

10. An image processing system, applied to a deep learning model, wherein a cache queue is provided in front of each layer of the deep learning model, and the image processing system comprises:

a memory for storing computer program; and a processor for performing steps of the image processing method according to claim 4 when executing the computer program.

11. An image processing system, applied to a deep learning model, wherein a cache queue is provided in front of each layer of the deep learning model, and the image processing system comprises:

a memory for storing computer program; and a processor for performing steps of the image processing method according to claim 5 when executing the computer program.

12. An image processing system, applied to a deep learning model, wherein a cache queue is provided in front of each layer of the deep learning model, and the image processing system comprises:

a memory for storing computer program; and a processor for performing steps of the image processing method according to claim 6 when executing the computer program.

13. The image processing method according to claim 2, wherein, after obtaining the to-be-processed data corresponding to the plurality of channels from the cache queue in front of the at least one layer, the method further comprises:

sending read information of the to-be-processed data corresponding to a previous layer, so that a next to-be-processed image corresponding to the previous layer is processed, and the computation result is saved to a storage position of the to-be-processed data corresponding to the read information of the to-be-processed data.

14. The image processing method according to claim 3, wherein, after obtaining the to-be-processed data corresponding to the plurality of channels from the cache queue in front of the at least one layer, the method further comprises:

sending read information of the to-be-processed data corresponding to previous layer, so that a next to-be-processed image corresponding to the previous layer is processed, and the computation result is saved to a storage position of the to-be-processed data corresponding to the read information of the to-be-processed data.

15. The image processing method according to claim 4, wherein, after obtaining the to-be-processed data corresponding to the plurality of channels from the cache queue in front of the at least one layer, the method further comprises:

sending read information of the to-be-processed data corresponding to a previous layer, so that a next to-be-processed image corresponding to the previous layer is processed, and the computation result is saved to a storage position of the to-be-processed data corresponding to the read information of the to-be-processed data.

16. The image processing method according to claim 5, wherein, after obtaining the to-be-processed data corresponding to the plurality of channels from the cache queue in front of the at least one layer, the method further comprises:

sending read information of the to-be-processed data corresponding to a previous layer, so that a next to-be-processed image corresponding to the previous layer is processed, and the computation result is saved to a storage position of the to-be-processed data corresponding to the read information of the to-be-processed data.

* * * * *